(12) United States Patent
Agardh (10) Patent No.: US 11,349,625 B2
(45) Date of Patent: May 31, 2022

(54) LOW DUTY CYCLE PROXIMITY BASED ACKNOWLEDGEMENT

(71) Applicant: Sony Corporation, Tokyo (JP)

(72) Inventor: Kåre Agardh, Rydebäck (SE)

(73) Assignee: Sony Group Corporation, Tokyo (JP)

( * ) Notice: Subject to any disclaimer, the term of this patent is extended or adjusted under 35 U.S.C. 154(b) by 79 days.

(21) Appl. No.: 16/757,788

(22) PCT Filed: Mar. 14, 2018

(86) PCT No.: PCT/IB2018/051705
§ 371 (c)(1),
(2) Date: Apr. 21, 2020

(87) PCT Pub. No.: WO2019/175628
PCT Pub. Date: Sep. 19, 2019

(65) Prior Publication Data
US 2021/0258124 A1 Aug. 19, 2021

(51) Int. Cl.
*H04L 5/00* (2006.01)
*H04W 76/40* (2018.01)
*H04W 8/00* (2009.01)
*H04W 84/18* (2009.01)

(52) U.S. Cl.
CPC ........... *H04L 5/0055* (2013.01); *H04W 8/005* (2013.01); *H04W 76/40* (2018.02); *H04W 84/18* (2013.01)

(58) Field of Classification Search
CPC .... H04L 5/0055; H04W 76/40; H04W 8/005; H04W 84/18
See application file for complete search history.

(56) References Cited

U.S. PATENT DOCUMENTS

| | | | |
|---|---|---|---|
| 10,200,160 B2* | 2/2019 | Lee | H04L 1/18 |
| 10,447,459 B2* | 10/2019 | Fakoorian | H04W 72/0446 |
| 2011/0032925 A1* | 2/2011 | Lee | H04L 1/1812 370/345 |
| 2014/0314004 A1* | 10/2014 | Zhou | H04L 5/0007 370/329 |
| 2016/0197704 A1* | 7/2016 | Liu | H04L 1/1861 370/329 |
| 2016/0218832 A1* | 7/2016 | Dabeer | H04L 1/0073 |
| 2016/0219560 A1* | 7/2016 | Chen | H04L 1/1893 |
| 2016/0219618 A1* | 7/2016 | Rico Alvarino | H04W 72/1294 |

(Continued)

FOREIGN PATENT DOCUMENTS

| | | | |
|---|---|---|---|
| EP | 2293485 A1 * | 3/2011 | H04L 1/1614 |
| WO | 2013/033693 A2 | 3/2013 | |

OTHER PUBLICATIONS

International Search Report and Written Opinion for corresponding Patent Application No. PCT/IB2018/051705 dated Jan. 28, 2019.

(Continued)

*Primary Examiner* — Michael J Moore, Jr.
(74) *Attorney, Agent, or Firm* — Renner, Otto, Boisselle & Sklar, LLP (57) ABSTRACT

A method and system for controlling network communications between a plurality of devices and a network node. The plurality of devices includes one or more devices of a group. If the network node receives messages from devices of a group, the network node sends a group ACK to the group of devices.

8 Claims, 8 Drawing Sheets

(56) References Cited

U.S. PATENT DOCUMENTS

| | | | |
|---|---|---|---|
| 2017/0311182 A1* | 10/2017 | Tenny | H04W 72/0446 |
| 2018/0013519 A1* | 1/2018 | Lee | H04L 1/1822 |
| 2018/0227088 A1* | 8/2018 | Bhattad | H04W 72/0446 |
| 2018/0316477 A1* | 11/2018 | Lee | H04W 72/0413 |
| 2019/0075584 A1* | 3/2019 | Li | H04L 1/1893 |
| 2019/0104541 A1* | 4/2019 | Lee | H04W 74/0833 |

OTHER PUBLICATIONS

SEQUANS: "DL HARQ feedback for UL grant free transmission", 3GPP Draft; RI-1718722—DL Feedback for UL Grant Free Transmission, 3rd Generation Partnership Project (3GPP), Mobile Competence Centre ; 650, Route Des Lucioles ; F-06921 Sophia-Antipolis Cedex ; FR, vol. RAN WGI, No. Prague, CZ; Oct. 9-Oct. 13, 2017, Oct. 8, 2017 (Oct. 8, 2017), XP051341895, Retrieved from the Internet: URL:http://www.3gpp.org/ftp/Meetings -3GPP-SYNC/RANI/Docs/ [retrieved on Oct. 8, 2017] section 2.2.

* cited by examiner

LOW DUTY CYCLE PROXIMITY BASED ACKNOWLEDGEMENT

TECHNICAL FIELD

The present disclosure relates generally to wireless networking devices and more particularly to a framework for wireless network communications.

BACKGROUND

Wireless sensor networks are being used more and more extensively in, e.g., smart cities, industrial internet of things (IoT), and smart homes. These wireless sensors communicate environmental conditions over a network to a network node. Often, sensors are used in close proximity to each other, with each sensor separately communicating with the network node. For example, presence sensors in a meeting room may include one sensor positioned to detect movement of people passing through a door and a number of additional sensors positioned under a table pointing at each chair to detect an exact number of persons in the room.

SUMMARY

Wireless sensors commonly implement wireless technologies in the unlicensed wireless spectrum. Use of unlicensed spectrum implies certain rules that all devices need to follow (e.g., a maximum power output or limits on active duty cycle). Duty cycle requirements in particular keep traffic to a minimum, sometimes forcing devices to cut down on robustness and quality of service.

To create robust wireless communications, messages from wireless devices should be acknowledged with an acknowledgement message (ACK) from the network node to each wireless device. But, because many frequency bands where these communications take place have limitations of, e.g., 0.1%-1% duty cycle, ACKs cannot always be sent from the network node to the devices.

The present disclosure provides a method for conserving network bandwidth by grouping devices and permitting a network node to send a single acknowledgement message (ACK) to a group of devices (as opposed to each device of the group individually).

The present disclosure also provides a method to identify neighboring wireless devices in combination with a protocol and addressing scheme to reduce the need for multiple data transfers in a duty cycle constrained network.

According to one aspect, there is provided a method for controlling network communications between a plurality of devices and a network node. The method includes receiving, at the network node, a message from one or more devices of a group of the plurality of devices and sending, from the network node, a group acknowledgement message (ACK) to the group of devices.

Alternatively or additionally, each device in the group of devices is configured to send at least one message to the network node within a time interval. The method further includes, if a message is not received at the network node from at least one device of the group of devices within the time interval, sending from the network node a non-acknowledgement message (NACK) to said at least one device of the group of devices indicating that a message was not received.

Alternatively or additionally, each device in the group of devices is configured to send at least one message to the network node within a time interval. The method further includes, if a message is not received at the network node from at least one device of the group of devices within the time interval and if a number of devices in the group of devices that the network node did not receive a message from is greater than or equal to a number of devices in the group of devices that the network node did receive a message from, sending from the network node a group non-acknowledgement message (NACK) to the group of devices and an ACK to one or more devices of the group of devices that the network node did receive a message from. If a message is not received at the network node from at least one device of the group of devices within the time interval and if the number of devices in the group of devices that the network node did receive a message from is greater than the number of devices in the group of devices that the network node did not receive a message from, sending, from the network node, a group ACK to the group of devices and a NACK to the at least one device of the group of devices.

Alternatively or additionally, each device in the group of devices is configured to send at least one message to the network node within a time interval. The method further includes, if a message is received by the network node from every device of the group of devices, sending from the network node a group ACK to the group of devices.

Alternatively or additionally, if the message received by the network node is an urgent message, sending from the network node an ACK to the device that sent the urgent message.

According to another aspect, there is provided a network node for communications with a plurality of devices. The network node is configured to receive a message from one or more devices of a group of the plurality of devices; and send a group acknowledgement message (ACK) to the group of devices.

Alternatively or additionally, each device in the group of devices is configured to send at least one message to the network node within a time interval. The network node is further configured to, if a message is not received from at least one device of the group of devices within the time interval, send a non-acknowledgement message (NACK) to said at least one device of the group of devices indicating that a message was not received.

Alternatively or additionally, each device in the group of devices is configured to send at least one message to the network node within a time interval, the network node further configured to, if a message is not received from at least one device of the group of devices within the time interval and if a number of devices in the group of devices that the network node did not receive a message from is greater than or equal to a number of devices in the group of devices that the network node did receive a message from, send a group non-acknowledgement message (NACK) to the group of devices and an ACK to one or more devices of the group of devices that the network node did receive a message from. If a message is not received from at least one device of the group of devices within the time interval and if the number of devices in the group of devices that the network node did receive a message from is greater than the number of devices in the group of devices that the network node did not receive a message from, the network node is configured to send a group ACK to the group of devices and a NACK to the at least one device of the group of devices.

Alternatively or additionally, each device in the group of devices is configured to send at least one message to the network node within a time interval. The network node further configured to, if a message is received from every device of the group of devices, send a group ACK to the group of devices.

Alternatively or additionally, if the message received by the network node is an urgent message, the network node is configured to send an ACK to the specific device that sent the urgent message.

According to a further aspect, there is provided a method for communicating over a network between a plurality of devices and a network node. The method includes receiving by a new device of the plurality of devices a signal sent by at least one other device of the plurality of devices to the network node. The new device analyzes the received signal to determine a neighboring device and transmits a connection request message to the network node requesting to join a group of the plurality of devices that the neighboring device is a member.

Alternatively or additionally, the received signal includes a group address of the device transmitting the received signal. Transmitting from the new device the connection request message to the network node includes (1) determining by the new device the group address of the neighboring device included in a signal received by the new device from the neighboring device and (2) including by the new device the group address of the neighboring device.

According to an another aspect, there is provided a device of a plurality of devices for communications with a network node. The device is configured to receive a signal sent by at least one other device of the plurality of devices to the network node. The device is also configured to analyze the received signal to determine a neighboring device and transmit a connection request message to the network node requesting to join a group of the plurality of devices that the neighboring device is a member.

Alternatively or additionally, the received signal includes a group address of the device transmitting the received signal. Transmitting the connection request message to the network node includes: (1) determining by the device the group address of the neighboring device included in a signal received by the device from the neighboring device and (2) including by the device the group address of the neighboring device.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

DETAILED DESCRIPTION

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

The present invention provides a method for controlling network communications between a plurality of devices and a network node. The plurality of devices includes one or more devices of a group. If the network node receives messages from devices of a group, the network node sends a group ACK to the group of devices.

Figure 1:
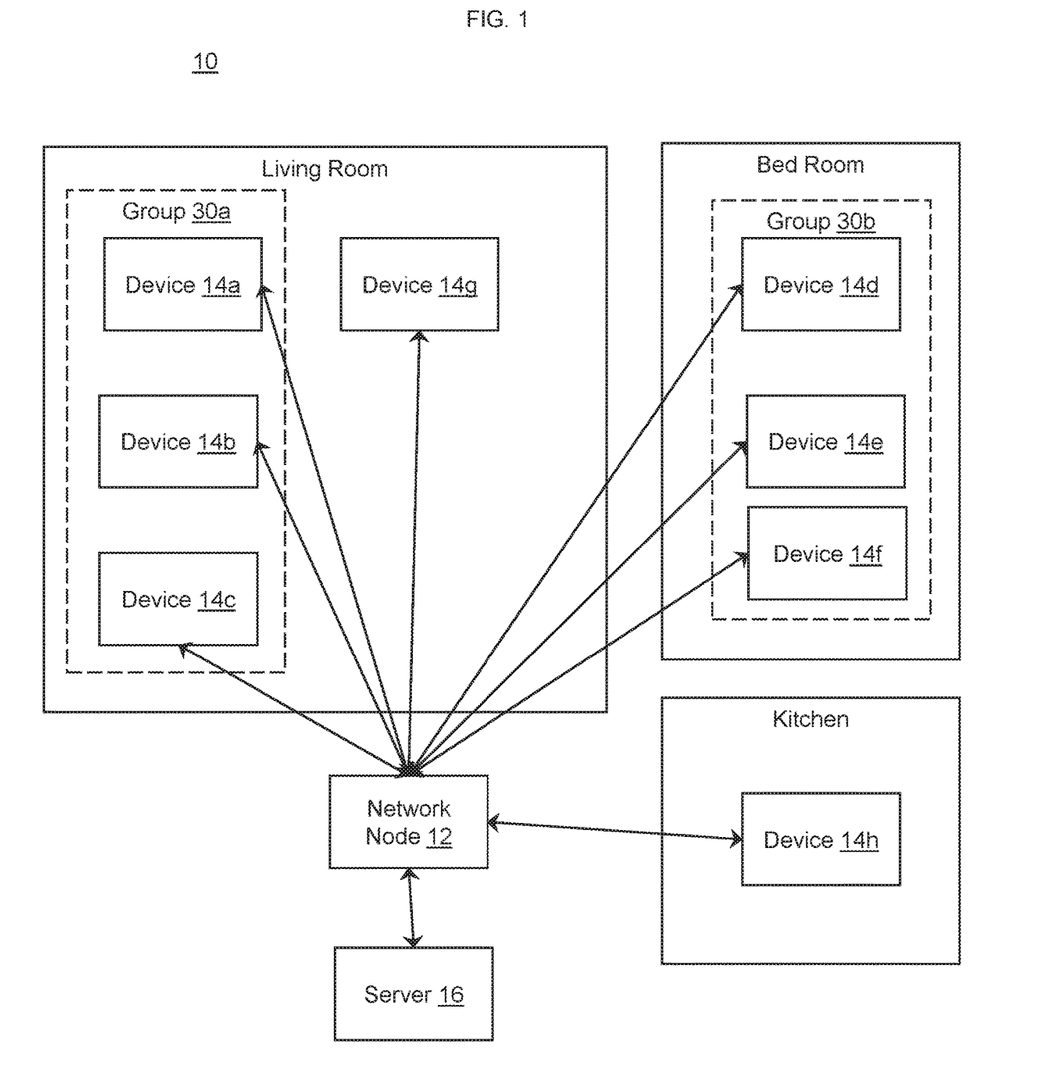
FIG. 1 is a schematic diagram of a communication system including a plurality of devices and a network node.
Figure 2:
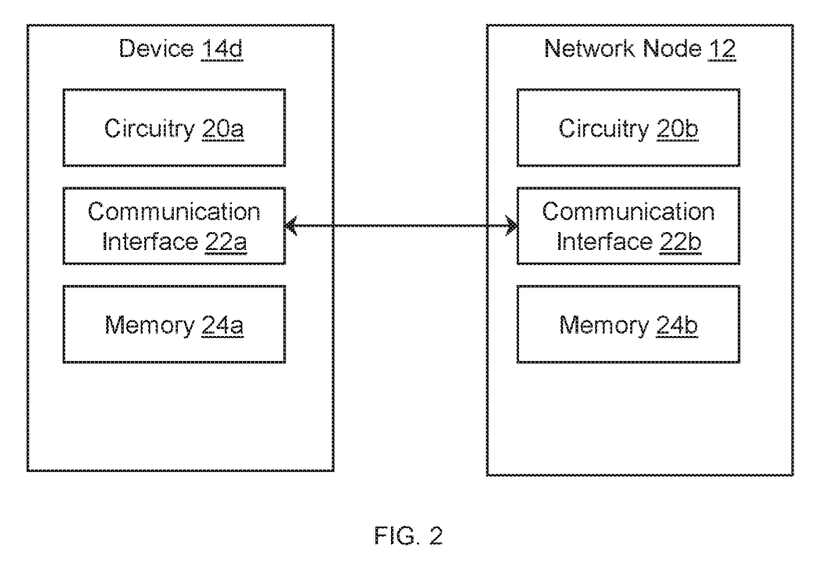
FIG. 2 is a schematic diagram of one of the devices and the network node of FIG. 1.

Turning to FIGS. 1 and 2, a communication system 10 including a network node 12 and a plurality of devices 14 is shown. The devices 14 are connected to the network node 12 and the network node 12 may forward messages (e.g., reports) to a server 16. The plurality of devices 14 include grouped devices (i.e., devices that are members of a group 30) and may also include lone device(s) (i.e., device(s) that are not a member of a group 30). The plurality of devices 14 are configured to send messages 30 to the network node 12. When the network node 12 receives a message 40 from a lone device 14, the network node 12 sends an acknowledgement message (ACK) 32 to the lone device 14. The network node 12 receives a message 40 from one or more devices 14 of a group 30 of the plurality of devices. In response, the network node 12 sends a group ACK 32 to the group of devices 30.

Figure 3:
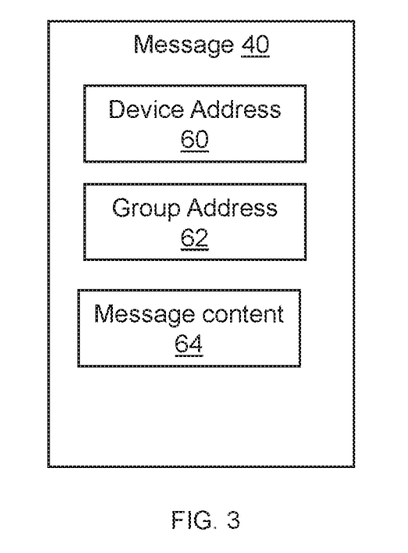
FIG. 3 is a schematic diagram of a message sent by one of the devices to the network node of FIG. 1.

Turning to FIG. 3, each message 40 may include a device address 60, a group address 62, and message content 64. As is described in further detail below, the device address 60 and group address 62 may be combined together (also referred to as an identifier).

The devices 14 may comprise a number of different wireless sensors (e.g., environmental sensors, presence sensors, etc.) positioned in an area (e.g., a building). Often, such devices 14 are insensitive to latency. That is, the devices 14 may report to the network node 12 and/or receive a response from the network node 12 with varying intervals. For example, a smart home may take action on reports of where people are in the house, what the temperature is, if windows and doors are open, etc. to control heating, lightning, etc. For these applications, a latency of a few seconds may not be critical.

The network node 12 may comprise any networking hardware device allowing the devices 14 to wirelessly connect to a network (e.g., a wired or wireless network). For example, the network node 12 may comprise an access point, a router, a hotspot, or any suitable device connecting a wireless device to a network.

The network node 12 and devices 14 each include circuitry (also referred to as a controller) 20, a communication interface 22, and memory 24. As will be understood by one of ordinary skill in the art, the circuitry 20 may have various implementations. For example, the circuitry 20 may include any suitable device, such as a processor (e.g., CPU), programmable circuit, integrated circuit, memory and I/O circuits, an application specific integrated circuit, microcontroller, complex programmable logic device, other programmable circuits, or the like. The circuitry 20 may also include a non-transitory computer readable medium (memory) 24, such as random access memory (RAM), a read-only memory (ROM), an erasable programmable read-only memory (EPROM or Flash memory), or any other suitable medium. Instructions for performing the functions performed by the network node 12 and devices 14 (e.g., the method described below) may be stored in the non-transitory computer readable medium and executed by the circuitry 20. The circuitry 20 may be communicatively coupled to the computer readable medium 24 and communication interface 22 through a system bus, mother board, or using any other suitable structure known in the art.

As will be understood by one of ordinary skill in the art, the communication interface 22 may comprise a wireless network adaptor or any suitable device that provides an interface between the network node 12 and the devices 14. The communication interface 22 may be communicatively coupled to the computer readable medium 24, such that the communication interface 22 is able to send data stored on the computer readable medium 24 across the network and store received data on the computer readable medium 24. The communication interface 22 may also be communicatively coupled to the circuitry 20 such that the circuitry is able to control operation of the communication interface 22.

Figure 4:
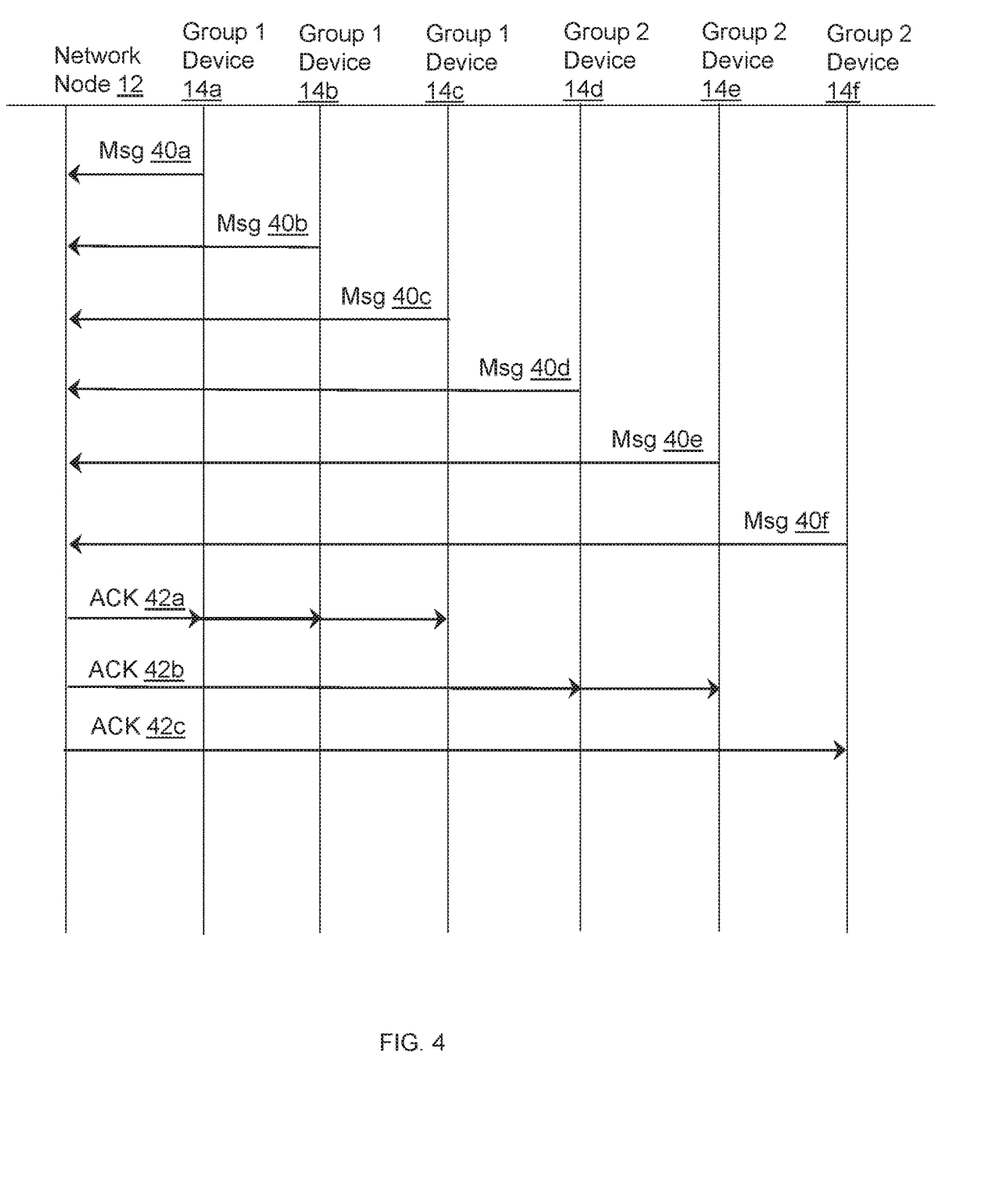
FIGS. 4-6 are ladder diagrams depicting communications between the network node and the devices of FIG. 1.

Turning to FIGS. 1 and 4, each device 14 of the plurality of may be configured to send at least one message 40 to the network node within a time interval (e.g., every minute, every 10 minutes, every 30 minutes, etc.). In the figures, three devices 14a, 14b, 14c are a member of group 1 30a and three devices 14d, 14e, 14f are a member of group 2 30b. As shown in FIG. 4, if the network node 12 receives a message 40 from every device 14 of the group of devices 30, the network node 12 may send a group ACK 42 to the group of devices 30. Consequently, because a message 40 was received from every device 14 of group 1 and group 2, a group ACK 42 was sent to group 1 and group 2. As is described in further detail below, a group ACK 42 may be sent to a group of devices 30 by including a group identifier in the ACK 42.

Figure 5:
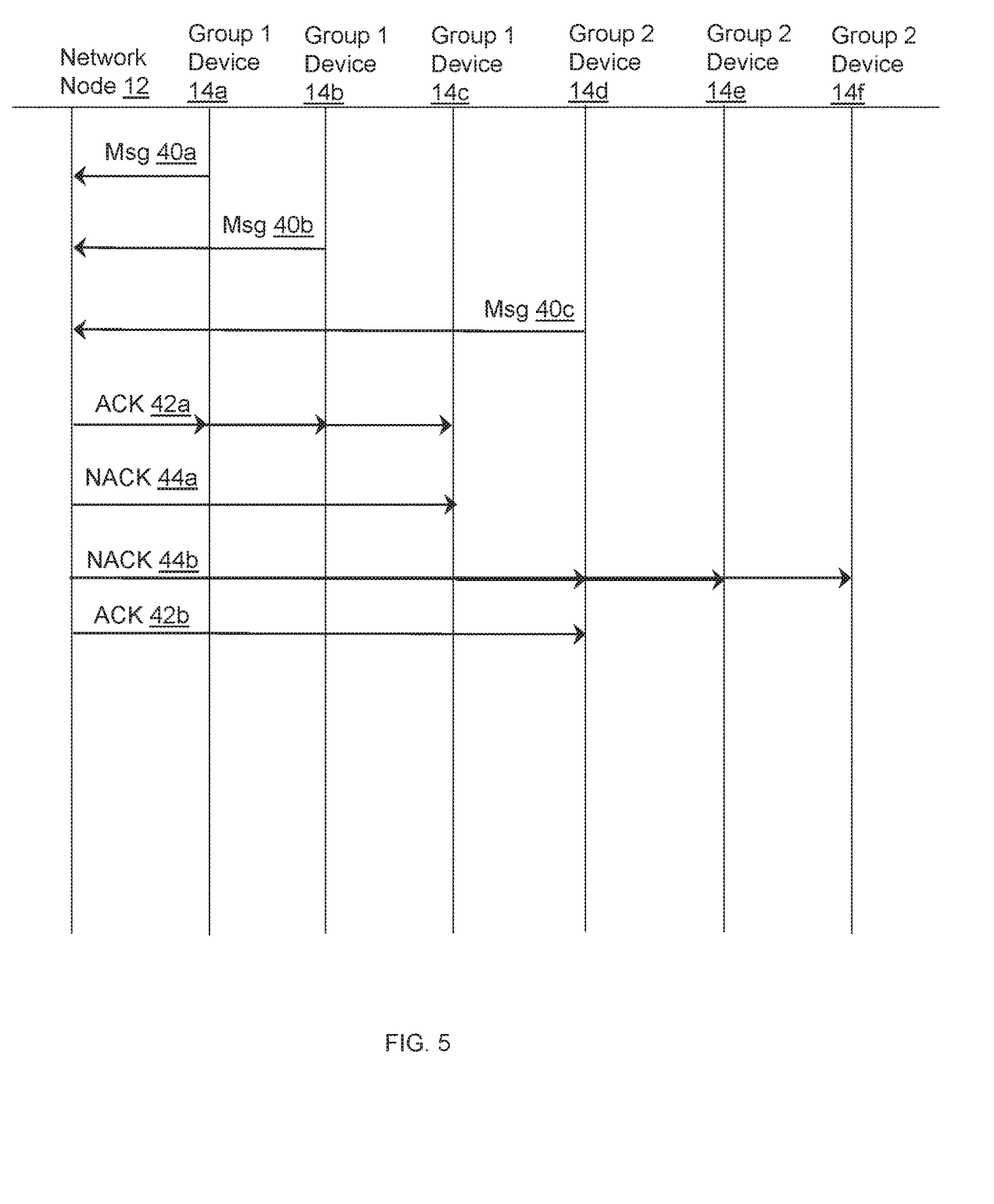

Turning to FIG. 5, if a message 40 is not received at the network node 12 from at least one device 14 of a group of devices 30 within the time interval, the network node 12 may send a non-acknowledgement message (NACK) 44 to the at least one device 14 of the group 30 indicating that a message 40 was not received. For example, in FIG. 5, a message 40 was not received from device 14c. In response, the network node 12 sends a group ACK 42a to the group of devices 30 and a NACK 44a to device 14c.

The network node 12 may wait a time duration at least as long as the time interval (e.g., twice as long, three times as long, or five times as long as the time interval) before sending a NACK.

As will be understood by one of ordinary skill in the art, a message 40 may not be received by the network node 12 from a device 14, because the device 14 did not send a message (e.g., because the device 14 is turned off) or alternatively the device 14 may send a message 40 that is never received by the network node 12 (e.g., due to environmental interference).

With continued reference to FIG. 5, if a number of devices 14 in the group of devices that the network node 12 did not receive a message 40 from is greater than or equal to a number of devices 14 in the group of devices 30 that the network node 12 did receive a message 40 from, the network node 12 may send a group NACK 44 to the group of devices 30 and an ACK 42 to one or more devices 14 of the group of devices 30 that the network node 12 did receive a message 40 from. For example, because the network node 12 did not receive messages 40 from two devices 14e, 14f of the three devices 14d, 14e, 14f in the group 30, the network node 12 sent a group NACK 44b to the group 30 and an ACK 42b to the device 14d that a message 40 was received from.

If the number of devices 14 in the group 30 that the network node 12 did receive a message 40 from is greater than the number of devices 14 in the group 30 that the network node 12 did not receive a message 40 from, the network node 12 may send a group ACK 42 to the group of devices 30 and a NACK 44 to the at least one device 14 of the group of devices 30 (i.e., the devices that the network node 12 did not receive a message 40 from). For example, because the network node 12 received messages 40 from two devices 14a, 14b of the three devices 14a, 14b, 14c in group 1, the network node 12 sent a group ACK 42a to the group 30 and a NACK 44a to the device 14c that a message 40 was not received from.

While the network node 12 is described as sending a group NACK 42 to the group of devices 30 if the number of devices 14 in the group 30 that the network node 12 did receive a message 40 from is equal to the number of devices 14 in the group 30 that the network node 12 did not receive a message 40 from, the network node 12 may instead send a group ACK 42 to the group of devices 30 and a NACK 44 to the at least one device 14 of the group of devices 30 (i.e., the devices that the network node 12 did not receive a message 40 from).

When a particular group of devices 30 transmits messages to the network node 12 and the particular group of devices 30 does not receive an ACK 42 from the network node 12, the particular group of devices 30 may retransmit the transmitted messages 30 to the network node 12.

As opposed to waiting a duration of time before sending an ACK 42, the network node 12 may send an ACK 42 more immediately in some circumstances. For example, if the message 40 received by the network node 12 is an urgent message 40, the network node 12 may send an ACK 42 to the device 14 that sent the urgent message 40. That is, even if the device 14 that sent the urgent message 30 is a member of a group 30, the network node 12 may send an ACK 42 to the device 14 as opposed to sending a group ACK to the group of devices 30.

A message 40 may be identified as urgent by a flag in the message. For example, a routine message sent periodically (i.e., a heart beat or stay alive message) may include a flag indicating that the messages are not urgent. An example of an urgent message may be when a motion sensor senses movement. As will be understood by one of ordinary skill in the art, the decision to flag a message as urgent may be determined by preprogramming into a device or by user preference.

Figure 6:
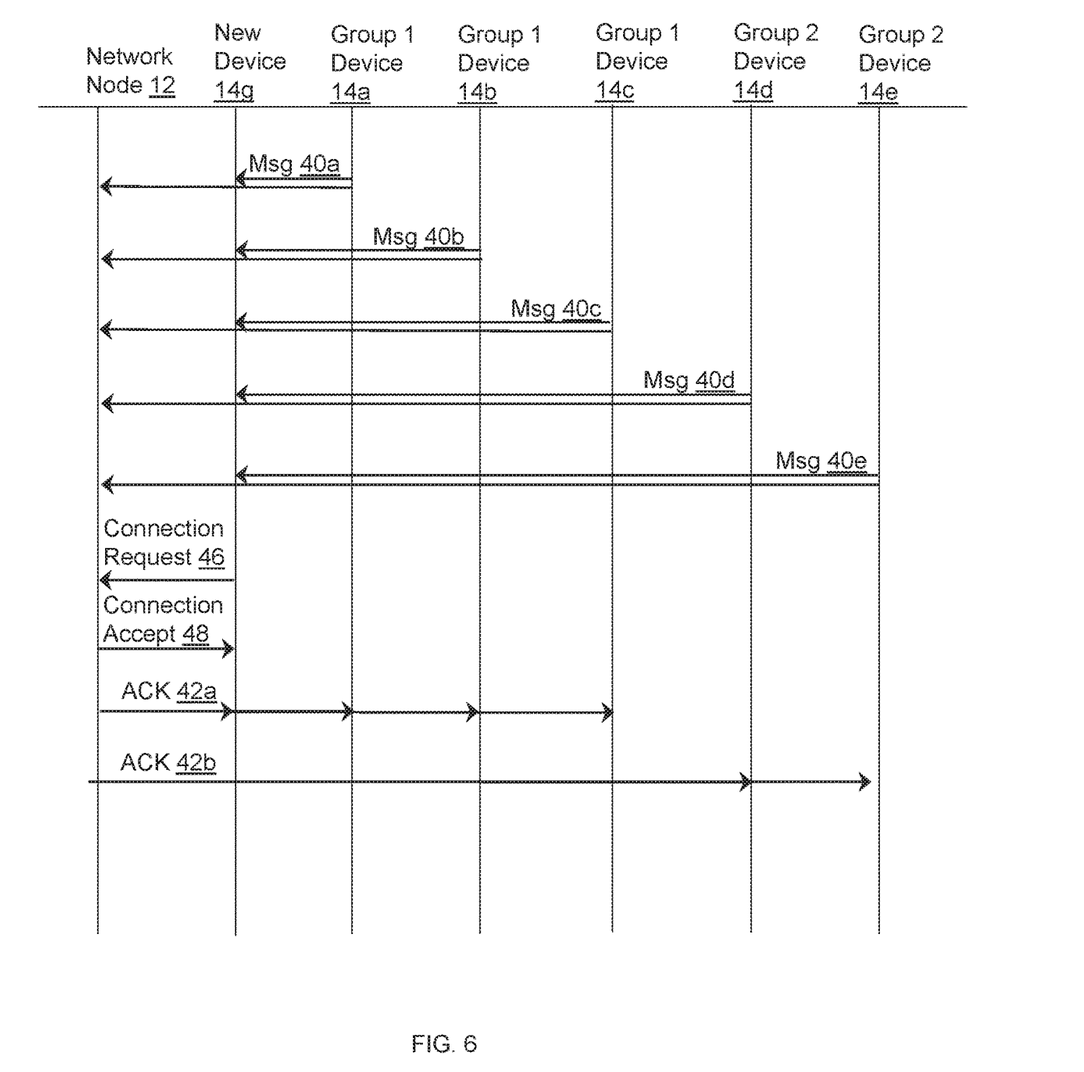

A user may specify which group 30 each device 14 of the plurality of devices is a member of. Alternatively, as shown in FIGS. 1 and 6, when a new device 14g connects to the network node 12, the new device 14g may transmit a connection request message 46 to the network node 12 requesting to join a particular group of devices 30. In response to the received connection request message 46, the network node 12 may transmit to the new device 14g a connection accept message 48 including a new device address 60 for the new device 14g. When the network node 12 sends a message to the new device 14g, the message 40 may include a group address 62 of the particular group of devices 30 and the new device address 60. The new device address 60 may be dynamic (e.g., similar to an IP address). Following the network node 12 sending the device address 60 and group address 62 to the new device 14g, when the new device 14g sends a message 40 to the network node 12, the new device 14g may use the received group address 62 and device address 60 as the identifier of the source of the message 40.

The group address 62 may be include in the connection request message 46 or in the connection accept message 48. That is, the new device 14 may request to join a particular group 30 by providing a group address 62 in the connection request message 46. Alternatively, the new device 14g may instead rely on the network node 12 to choose a particular group 30 for the new device 14g to join.

For example, prior to sending a connection request message 46, the new device 14g may receive (e.g., overhear) a signal (e.g., one or more message 40) sent by at least one other device 14a-f of the plurality of devices 14 to the network node 12 as shown in FIG. 6. Because the signals are sent wirelessly, one or more of the devices 14 (other than the network node 12) may also receive the signals. The new device 14g may analyze the received signals to determine a neighboring device. The new device 14g may transmit the connection request message 46 to the network node 12 requesting to join a group 30 (e.g., the particular group 30 that the determined neighboring device is a member of).

With continued reference to FIG. 6, the new device 14g may analyze the received signals to determine the neighboring device after receiving signals sent by other devices 14 for a duration of time. In this way, the new device 14g may ensure that it has received signals sent by most (or all) of the nearby devices before requesting to join a group 30. As described above, the devices 14 may be configured to send at least one message 40 to the network node 12 within a time interval. To ensure that messages 40 from devices 14 are not missed due to timing, the new device 14g may wait longer than the time interval before requesting to join a group 30.

The new device 14g may determine the neighboring device 14 based on a signal strength of the received signal. For example, the neighboring device 14g may be determined to be the device 14 that sent the received signal having a strongest signal strength.

In the example shown in FIG. 5, the new device 14g receives messages 40 sent by the other devices 14a-14f in two different groups 30. In this example, upon analyzing the received messages, the new device 14g finds that the average signal strength of the messages 40 received from device 14c (a member of group 1) is the highest. The new device 14g then sends a connection request message 46 requesting to connect to the network node 12 and to be a member of group 1. In response, the network node 12 sends a connection accept message 48 specifying that new device 14g is a member of group 1.

As will be understood by one of ordinary skill in the art, FIG. 5 shows signals (e.g., messages 40, AKCs 42, connection request messages 46, connection acceptance transmissions 48, etc.) being sent by the network node 12 or one of the devices 14. These signals are also shown as being received by the network node 12 and/or one or more of the devices 14. Because the signals are being sent wirelessly, the signals may be received by devices 14 other than those shown in the figures. As opposed to showing that the signals may be received by additional (or all) of the devices 14, FIG. 5 shows signals being received by devices 14 that take a described action based on the received signal(s). For example, while ACK 42a is shown as being received by devices 14a, 14b, and 14c, ACK 42a may also be received by devices 14d, 14e, and/or 14f.

To be determined as the neighboring device (and used in the determination of which group 30 to join), the signal strength of one or more received signals from a particular device may be required to be greater than a signal strength threshold. For example, in FIG. 1, device 14f is placed in a room (i.e., the kitchen) by itself away from other sensors. In this example, it may be undesirable for device 14f to be grouped with any of devices 14a-g, because these devices are located in different rooms (i.e., the living room and bedroom). For this reason, device 14h may use signal strength as an approximation of distance from the other devices 14a-g. Consequently, if the signals received by device 14h from the other devices 14a-g are below the signal strength threshold, then the device 14h may be assumed to be in a different room or region from the other devices 14a-g.

As will be understood by one of ordinary skill in the art, the signal strength threshold may be preloaded into the devices 14, may be set by a user, and/or may be determined in any suitable manner.

The determined neighboring device may also be limited to particular types of devices. For example, when adding a new light controller (e.g., a lighting fixture or light switch), the new light controller may only request to join groups including other light controllers. In another example, a new device may only request to join groups with devices having similar operating parameters (e.g., similar duty cycles for sending messages to the network node 12). The determination of which devices in the plurality of devices are the same type (or have similar operating parameters) as a particular device may be made by the network node 12 or by the individual devices 14 (e.g., based on information transmitted by the devices 14).

Each of the received signals may include a group address of the device 62 transmitting the received signal. A new device 14 may use the group address 62 included in the received signals to determine a group 30 to join. For example, transmitting the connection request message 46 to the network node 12 requesting to join a group 30 that the determined neighboring device 14 is a member of may include determining the group address 62 of the neighboring device 14 included in a signal received form the neighboring device 14. This determined group address 62 may then be included in the connection request message 46. An identifier of the new device may also be included in the connection request message 46 in addition of the determined group address 62. The identifier of the new device may be, e.g., the MAC address, serial number, or any other suitable (e.g., unique) identifier of the new device.

As an example, device address 60 and group address 62 may combined be of the format 0xAAAAAD where D is the device address 60 and 0xAAAAA is the group address 62. In this example, new device 14g may receive messages from device 14a-14e and determine that device 14a in group 1 is the closest device (i.e., the neighboring device). In the messages 40 received by the new device 14g from device 14a, the messages 40 may include the device address 60 and group address 62 0xAAAAA0. New device 14g may report to the network node 12 0xAAAAA as the group address 62 of the group 30 that the new device 14g would like to join. The network node 12 may then respond with a connection accept message 48 stating that the new device 14g may connect to the network node 12 and that the new device 14g has the combined device address 60 and group address 62 of 0xAAAAA3 (i.e., the device address 60 is 3 and the group address 62 is 0xAAAAA).

Continuing this example, the network node 12 may wait a time to gather as many messages 40 from the devices 14 as possible and, if messages 40 are received from all four devices 14a-c, 14g of group 1, the network node 12 can send only one group ACK 42 to the group using 0xAAAAA as the only identifier (i.e., the group address 62 without any device address 60). In this way, multiple ACKs 42 are not needed and the active transmission time is 75% less than if ACKs 42 were sent to each device of the group individually, helping to avoid blocking by any duty cycle requirements.

Figure 7:
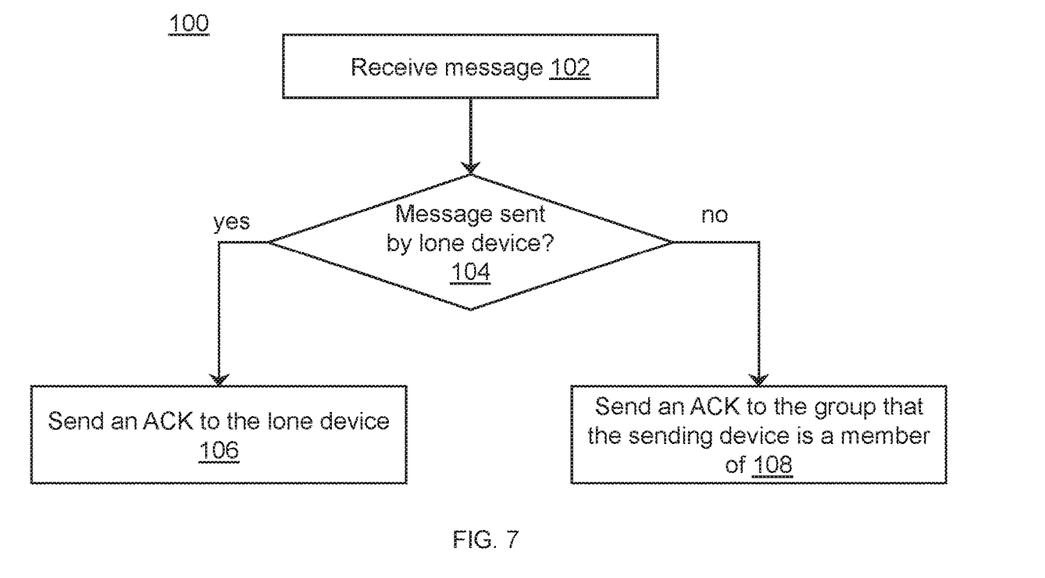
FIGS. 7-9 are flow diagrams showing methods for controlling network communications.

Turning to FIG. 7, a method 100 for controlling network communications is shown. The method 100 is performed by the network node 12. In process block 102, a message 30 is received by the network node 12. In decision block 104, a check is performed to determine if the received message was sent by a lone device. For example, the determination may be made by referring to a group address 62 included in the received message 30. A specific designation may be used in the group address 62 to identify lone devices or the group address 60 may be left blank for lone devices.

If the received message 40 is sent by a lone device, then an ACK 42 is sent to the lone device 14 by the network node 12 in process block 106. Alternatively, if the received message 40 is sent by a grouped device, then a group ACK is sent to the group 30 that the sending device 14 is a member of in process block 108.

Figure 8:
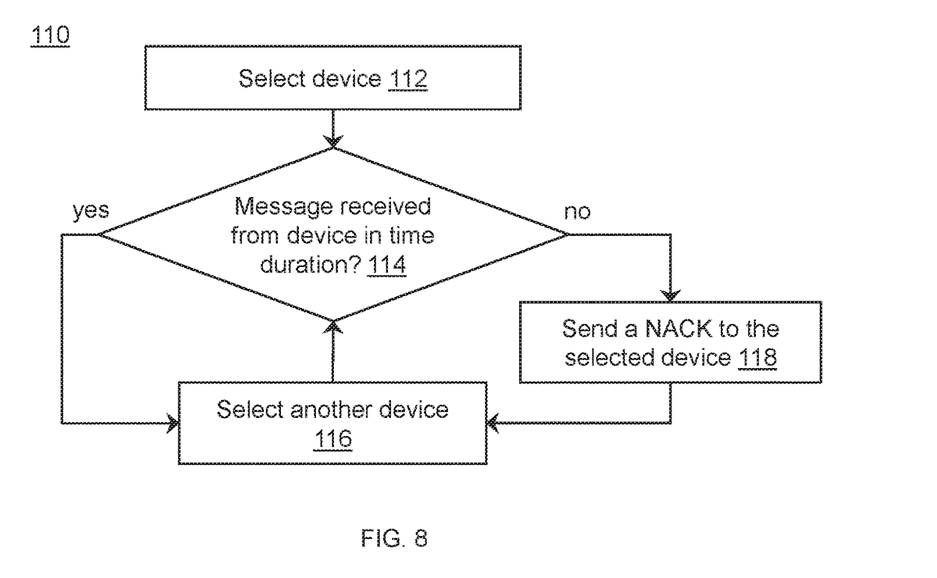

Turning to FIG. 8, another method 110 for controlling network communications is shown. In process block 112, the network node 12 selects a device 14. In decision block 114, a determination is made by the network node 12 regarding whether a message was received from the selected device in a time duration. As is described above, the plurality of devices are configured to send at least one message to the network node within a time interval and the time duration is at least as long as the time interval. If a message 40 was received, then another device 14 is selected in process block 116. Alternatively, if a message was not received, then a NACK 44 is sent to the selected device 118.

Figure 9:
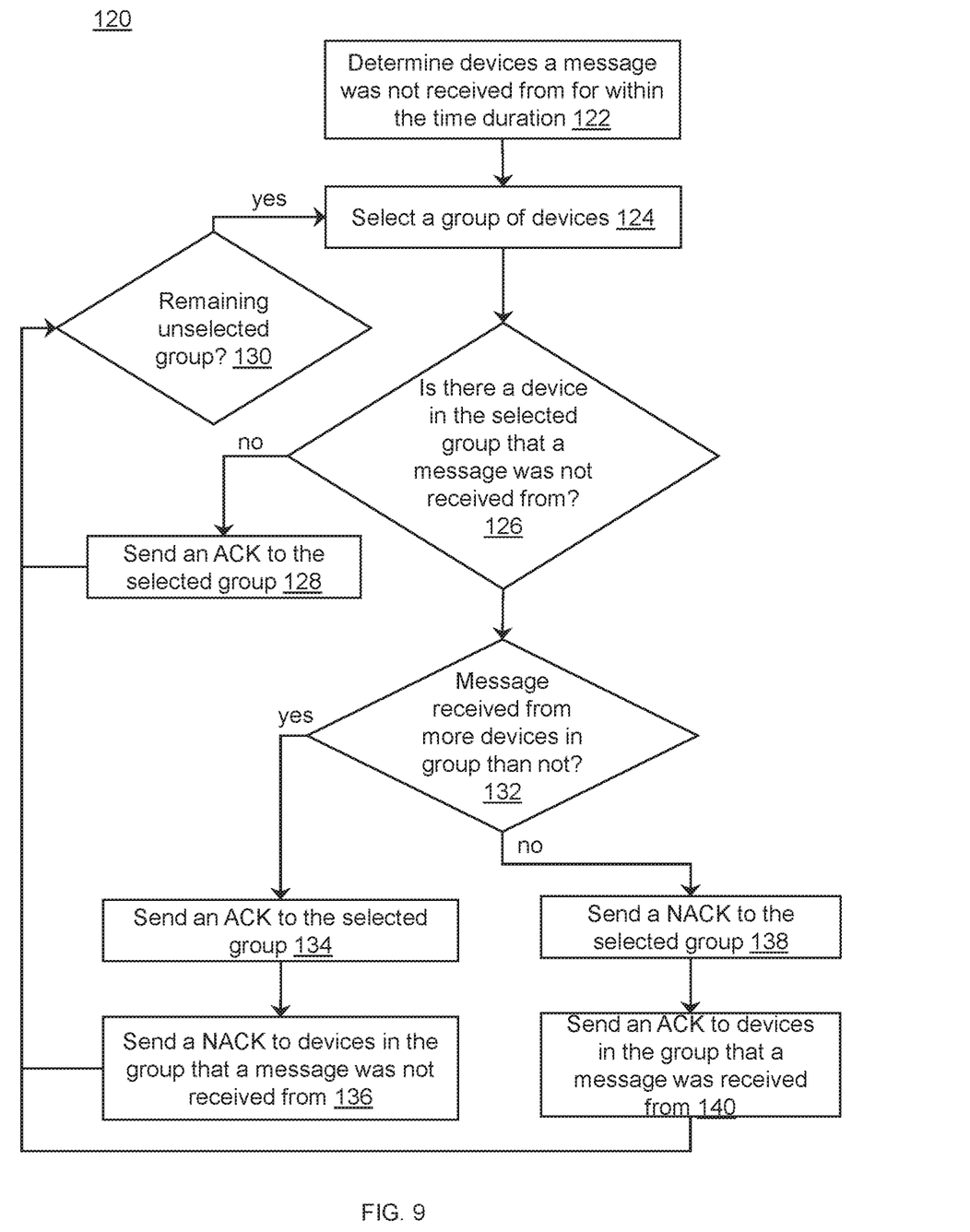

Turning to FIG. 9, a further method 120 for controlling network communications is shown. In process block 122, the network node 12 determines the devices 14 that a message was not received from within the time duration. In process block 124, one of the groups of devices 30 is selected. In decision block 126, a determination is made regarding whether there is a device in the selected group of devices 30 that a message 40 was not received from. If a message 40 was received from every device 14 in the selected group 30, then a group ACK 42 is sent to the selected group in process block 128.

Alternatively, if a message 40 was not received from at least one device 14 in the selected group 30, then a comparison is made in decision block 132 between a number of devices 14 in the group 30 that a message was received from to a number of devices 14 in the group 30 that a message was not received from. If a message 40 was received from more devices 14 in the group 30, then in process block 136 a group ACK 42 is sent to the selected group 30 in process block 134 and a NACK 44 is sent to the devices that a message 40 was not received from.

Alternatively, if a message was not received from more devices in the group 30, then in process block 140 a group NACK is sent to the selected group in process block 138 and an ACK 42 is sent to the devices in the selected group 30 that a message 40 was received from.

Following process blocks 128, 136, and 140, a determination is made in decision block 130 regarding whether there are any remaining unselected groups 30. If there are any remaining unselected groups 30, then the method returns to process block 124 where a new group of devices 30 is selected.

Figure 10:
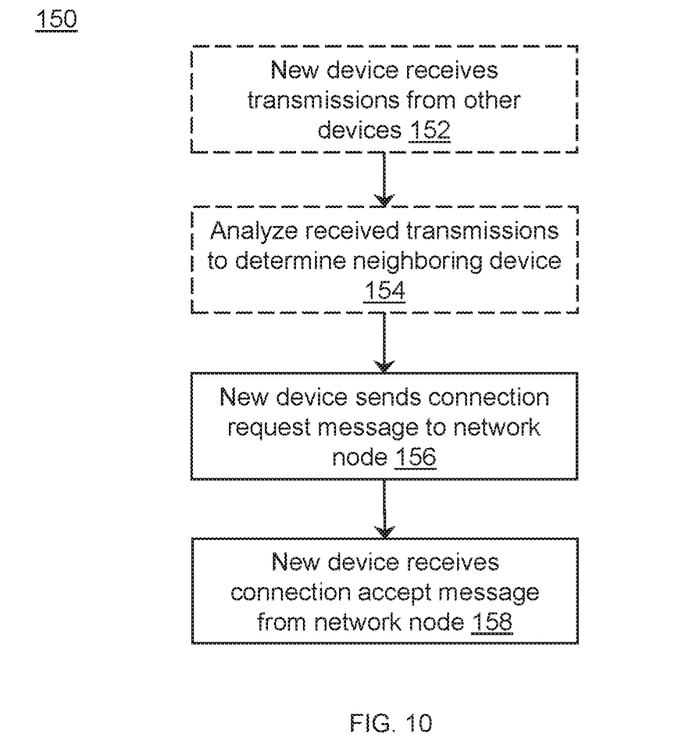
FIG. 10 is a flow diagram showing a method for connecting a new device to a network node.

Turning to FIG. 10, a method 150 for connecting a new device 14 to a network node 12 is shown. In optional process block 152, the new device 14 receives transmissions from the other devices 14. In optional process block 154, the received transmissions are analyzed to determine a neighboring device. In process block 156, the new device 14 sends a connection request message to the network node 12. In process block 158, the network node 12 transmits a connection accept message to the new device 14.

It should be appreciated that many of the elements discussed in this specification may be implemented in a hardware circuit(s), a processor executing software code or instructions which are encoded within computer readable media accessible to the processor, or a combination of a hardware circuit(s) and a processor or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a processor or control block executing code encoded in a computer readable media, or a combination of a hardware circuit(s) and a processor and/or control block executing such code.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method for controlling network communications between a plurality of devices and a network node, the method comprising:

receiving, at the network node, a message from one or more devices of a group of devices of the plurality of devices, wherein each device in the group of devices is configured to send at least one message to the network node within a time interval; and if the at least one message is not received, at the network node, from at least one device of the group of devices within the time interval:

sending, from the network node, a group acknowledgement message (ACK) to the group of devices if a number of devices in the group of devices that the network node did receive the at least one message from is greater than a number of devices in the group of devices that the network node did not receive the at least one message from, and sending, from the network node a group non-acknowledgement message (NACK) to the group of devices if the number of devices in the group of devices that the network node did not receive the at least one message from is greater than or equal to the number of devices in the group of devices that the network node did receive the at least one message from.

2. The method of claim 1, further comprising:

if the at least one message is not received, at the network node, from the at least one device of the group of devices within the time interval, sending, from the network node, a non-acknowledgement message (NACK) to said at least one device of the group of devices indicating that the at least one message was not received.

3. The method of claim 1, further comprising:

if the at least one message is not received, at the network node, from the at least one device of the group of devices within the time interval:

if the number of devices in the group of devices that the network node did not receive the at least one message from is greater than or equal to a number of devices in the group of devices that the network node did receive the at least one message from, sending, from the network node, an ACK to one or more devices of the group of devices that the network node did receive the at least one message from; and if the number of devices in the group of devices that the network node did receive the at least one message from is greater than the number of devices in the group of devices that the network node did not receive the at least one message from, sending, from the network node, a NACK to the at least one device of the group of devices.

4. The method of claim 1, further comprising:

if the at least one message received by the network node from the at least one device of the group of devices is an urgent message, sending, from the network node, an ACK to the at least one device that sent the urgent message.

5. A network node for communications with a plurality of devices, the network node being configured to:

receive at least one message from one or more devices of a group of devices of the plurality of devices, wherein each device in the group of devices is configured to send the at least one message to the network node within a time interval; and if the at least one message is not received from at least one device of the group of devices within the time interval:

send a group acknowledgement message (ACK) to the group of devices if a number of devices in the group of devices that the network node did receive the at least one message from is greater than the number of devices in the group of devices that the network node did not receive the at least one message from, and send a group non-acknowledgement message (NACK) to the group of devices if the number of devices in the group of devices that the network node did not receive the at least one message from is greater than or equal to the number of devices in the group of devices that the network node did receive the at least one message from.

6. The network node of claim 5, further configured to:

if the at least one message is not received from the at least one device of the group of devices within the time interval, send a non-acknowledgement message (NACK) to said at least one device of the group of devices indicating that the at least one message was not received.

7. The network node of claim 5, further configured to:

if the at least one message is not received from the at least one device of the group of devices within the time interval:

if the number of devices in the group of devices that the network node did not receive the at least one message from is greater than or equal to a number of devices in the group of devices that the network node did receive the at least one message from, send an ACK to one or more devices of the group of devices that the network node did receive the at least one message from;

if the number of devices in the group of devices that the network node did receive the at least one message from is greater than the number of devices in the group of devices that the network node did not receive the at least one message from, send a NACK to the at least one device of the group of devices.

8. The network node of claim 5, further configured to:

if the at least one message received by the network node from the at least one device of the group of devices is an urgent message, send an ACK to the at least one device that sent the urgent message.

* * * * *